United States Patent Office 2,994,680
Patented Aug. 1, 1961

2,994,680
GRAFT COPOLYMERS OF AN ALKENYL-SUBSTITUTED AROMATIC COMPOUND, AND UNSATURATED ESTER AND A PREFORMED COPOLYMER OF AN ALKENYL-SUBSTITUTED AROMATIC COMPOUND AND A POLYOLEFIN
Henry George Hammon, Columbus, Richard A. Clark, Worthington, and John W. Uttley, Jr., Hilliards, Ohio, assignors, by mesne assignments, to Shell Oil Company, Emeryville, Calif., a corporation of Delaware
No Drawing. Filed Oct. 29, 1958, Ser. No. 770,254
15 Claims. (Cl. 260—45.5)

This invention relates to new polymeric products and to a method for their preparation. More particularly, the invention relates to a new class of graft copolymers prepared from alkenyl-substituted aromatic compounds which have improved clarity and unusually high impact strength.

Specifically, the invention provides new and particularly useful graft copolymers comprising the product of polymerization of (1) an alkenyl-substituted aromatic compound, (2) an ethylenically unsaturated ester, and (3) a preformed copolymer of an alkenyl-substituted aromatic compound and a polyolefin.

Conventional styrene homopolymers and copolymers are useful as molding resins, but do not exhibit sufficient impact strength for a great many applications. Some conventional clear resins containing styrene may exhibit somewhat higher impact strengths. However, these resins usually are soft, have low heat distortion temperatures, and only obtain improved impact strength by sacrificing other useful properties.

Because of the ready availability of styrene and substituted styrenes at favorable prices, a need exists in the art for clear, high-impact strength, styrene molding resins based on polystyrenes, or conventional copolymers and terpolymers containing a styrene. Impact strength commonly obtained with polystyrene and its co- or terpolymers is in the order of 0.2 to 0.5 ft./lb./in., notch. Clear styrene-base polymers having excellent molding properties and having impact strengths greater than 0.5 ft./lb./in., would constitute a significant improvement in the art.

It is, therefore, an object of the invention to provide a superior molding resin. It is a further object to provide molding resins having superior impact strength. It is a further object to provide a high impact molding resin having improved clarity. It is a further object to provide a new high impact strength resin which is hard and has good heat resistance. These and other objects of the invention will be apparent from the following detailed description thereof.

It has now been discovered that these and other objects may be accomplished by the new graft copolymers of the invention comprising the product of polymerization of (1) an alkenyl-substituted aromatic compound, (2) an ethylenically unsaturated ester, and (3) a preformed copolymer of an alkenyl-substituted aromatic compound and a polyolefin. It has been found that these special graft copolymers have unexpectedly superior properties, particularly as to clarity and impact strength. The new graft copolymers, for example, have impact strengths above those of conventional polystyrene and have impact strengths which, in many cases, go as high or higher than 1.10 ft./lbs./in., notch. Surprisingly, these superior properties, such as clarity and improved impact strength, are obtained without any sacrifice in the other desired properties, such as hardness and good heat resistance.

The new copolymers of the invention are to be distinguished in structure from the conventional copolymers and terpolymers formed by polymerizing an initial mixture containing the monomers, such as the above-noted alkenyl-substituted aromatic compounds, unsaturated esters and polyolefins. In such a conventional process, the resulting polymers have a random mixture of the three monomer units all along the polymer backbone chain. The new copolymers of the invention, however, have a graft structure wherein the alkenyl-substituted aromatic compound and polyolefin units make up the polymer backbone chain and polymer chains of the alkenyl-substituted aromatic compounds and unsaturated ester units are attached (grafted) at random along the side of the said polymer backbone chain. Such a structure is unique in that the backbone polymer retains its original structure and the modification is in the graft sidechains instead of the backbone polymer itself. For clarity throughout the specification and claims, the initial preformed polymer used in making the graft copolymers may be referred to as the backbone polymer and the monomers used in making the graft polymer chains will be referred to as the grafting monomers.

The preformed polymer used as the backbone polymer in the preparation of the new graft copolymers of the present invention comprises the product of polymerization of an alkenyl-substituted aromatic compound and a polyolefin. The alkenyl-substituted aromatic compounds include those compounds having an alkenyl group, and preferably a 1-alkenyl group, e.g., a vinyl group, attached to a ring carbon atom of an aromatic ring. Examples of these include, among others, styrene, alpha-methylstyrene, vinyl toluene, 2-chlorostyrene, 4-chlorostyrene, 2,4-dichlorostyrene, 2,5-dichlorostyrene, vinyl naphthalene, 2-methylstyrene, 2,4-diethylstyrene, 2,3,4-trimethylstyrene, 2,4-diisobutylstyrene, 3-tert-butylstyrene, 4-octylstyrene, allylstyrene, 4-cyclohexylstyrene, and the like, and mixtures thereof. Preferred alkenyl-substituted aromatic compounds include the styrenes, such as styrene itself and the halo-substituted styrenes and styrenes substituted with a hydrocarbon radical, the substituents being on the vinyl side chain or on the aromatic ring. Particularly preferred are styrene, alpha-alkylstyrenes and the mono- and dichloro- and mono- and polyalkyl-substituted styrenes wherein the substituents are attached to ring carbon atoms, said substituted styrenes containing up to 12 carbon atoms. Coming under special consideration, particularly because of the superior properties of the resulting products as well as the ready available and low cost is styrene itself.

A minor portion, e.g. up to 10% by weight, of the alkenyl-substituted aromatic compound can be replaced with any of the hereinbelow described unsaturated esters.

The polyolefins used in the preparation of the preformed polymers comprising the conjugated open-chained dienes. Examples of such conjugated dienes include, among others, butadiene-1,3, isoprene, 2,3-dimethylbutadiene, pentadiene-1,3, methylpentadiene, and the like, and mixtures thereof. As the number of carbon atoms in the polyolefin is increased above eight, a decline in the favorable properties of the graft copolymer generally result. Remarkably superior results are obtained, however, when the diene contains 5 to 7 carbon atoms. Best results are obtained when the diene is isoprene.

The amount of the conjugated polyolefin in the finished preformed polymer may vary within certain limits. The amount of the polyolefin is small and should generally not be above 10 parts per 100 parts of the preformed polymer. Preferably, the polyolefin should be between .5 to 2 parts by weight and the alkenyl-substituted aromatic compound from 99.5 to 98 parts by weight.

The preformed polymers of the alkenyl-substituted aromatic compound and the polyolefins can be prepared by any suitable method. They may be prepared, for example, by polymerization in solution or in aqueous emulsion or suspension systems. The aqueous emulsion technique was found to give highly superior products and is the more preferred. In this case, the preformed polymers are preferably prepared by heating the monomers together in an aqueous emulsion in the presence of a free radical yielding catalyst. Examples of the preferred catalysts include, among others, per-acids as persulfuric acid, salts of peracids as ammonium persulfate, potassium persulfate, peroxides as benzoyl peroxide, hydrogen peroxide, di-tertiary butyl peroxide, di-tert-butyl succinate, tert-butyl peracetate, di-tert-butyl dipermalonate, and 2,2-bis(tert-butylperoxy)butane. The amount of the catalyst employed is preferably between 0.05% to 5% by weight of the monomers to be polymerized, and still more preferably between 0.1% and 1.0% by weight thereof.

Any of the known emulsifying agents may be employed. These include particularly the ionic surface active agents, especially those having a polar structure including a hydrophilic (predominantly hydrocarbon) residue and a charged (ionic) radical thereon, such as anionic surface-active compounds including alkali metal and nitrogen-base soaps of higher fatty acids, such as potassium and/or sodium myristate, laurate, palmitate, oleate, stearate, ammonium stearate, etc., as well as the surface-active compounds of the cation-active variety, such as salts of long-chain aliphatic amines and quaternary ammonium bases, such as lauryl amine hydrochloride, stearyl amine, hydrochloride, and palmityl amine hydrobromide. Additional examples of suitable ionic surface-active emulsifying agents include the alkali metal or ammonium alkyl or alkylene sulfates or sulfonates, such as sodium and/or potassium lauryl sulfate, alkyl, aryl and alkylated aryl sulfonates, cetyl sulfonate, oleyl sulfonate, stearyl sulfonate, sulfonated Turkey red oil, sulfonated mineral oils, sodium, potassium and ammonium isopropyl naphthalene sulfonate, amine soaps, such as triethanolamine stearate, amino-substituted alcohols, sulfonated fatty esters and amides, the hydrochloride of diethyl aminoethyloleyl-amide, trimethylcetyl ammonium methyl sulfate, alkene-sulfonic acids, alkali metal and ammonium salts of sulphonated long-chain hydrocarbons, or sulphonated long-chain fatty acids, such as sulphonated oleic acid and the sodium, potassium and ammonium salts of sulphated cetyl alcohol. Starch, gum-arabic, the polyoxyalkylene oxide condensates of hexitan anhydrides, carboxymethylcellulose, etc. may also be used.

In the event products are desired which have outstanding clarity one should employ emulsifying agents such as tetrasodium-N-(1,2-dicarboxyethyl)-N-octadecylsulfosuccinamate, which is commercially available under the name of Aerosol 22 as a 35 percent active solution, sodium dodecylbenzene sulfonate, which is commercially available under the trade name of Ultrawet 30, and decylbenzene sodium sulfonate, which is available under the trade name of Santomerse S. Especially preferred is Aerosol 22.

The emulsifying agents are preferably employed in amounts varying from about 0.1% to 5% by weight of the monomers to be polymerized.

The reaction is preferably conducted in an inert atmosphere, such as nitrogen, methane and the like.

Temperatures employed in the formation of the preformed backbone copolymer will vary depending upon the catalyst selected. Preferred temperatures range from about 40° C. to about 150° C. Particularly preferred temperatures range from about 40° C. to 80° C. Superatmospheric, atmospheric or subatmospheric pressures may be used as desired.

The above-described backbone polymer should be retained in the original polymerization mixture, such as the aqueous latex, for the subsequent grafting operation.

The monomers to be copolymerized with the above-described backbone polymer comprising the alkenyl-substituted aromatic compounds and the ethylenically unsaturated esters. The alkenyl-substituted aromatic compounds employed may be any of those described above for the preparation of the backbone copolymer, such as, for example, styrene, alpha-methylstyrene, vinyl toluene, 2-chlorostyrene, 4-chlorostyrene, 2,4-dichlorostyrene, vinylnaphthalene, 2-methylstyrene, 2,4-diethylstyrene, 2,3,4-trimethylstyrene, 4-cyclohexylstyrene, and the like, and mixtures thereof. The alkenyl-substituted aromatic compound selected preferably is, but need not be, the same as the alkenyl-substituted aromatic compound used in the preparation of the backbone copolymer. Particularly preferred alkenyl-substituted aromatic compounds include the styrenes, such as styrene itself and the halo-substituted styrenes and styrenes substituted with a hydrocarbon radical wherein the substituent is placed on the vinyl side chain or the aromatic ring. Especially preferred are the above-noted styrenes containing no more than 12 carbon atoms.

The unsaturated ester to be used in preparing the new graft copolymers comprise the monomeric organic esters possessing at least one

group and at least one carbon-to-carbon unsaturated linkage as an ethylenic linkage. A preferred group of the unsaturated esters comprise the esters of ethylenically unsaturated monocarboxylic acids and monohydric alcohols. Examples of this group comprise, among others, methyl methacrylate, ethyl methacrylate, butyl methacrylate, ethyl acrylate, isopropyl acrylate, cyclohexyl acrylate, allyl acrylate, allyl methacrylate, octyl acrylate, octenyl methacrylate, butyl crotonate, cyclohexyl crotonate, and the like. Another preferred group of unsaturated esters comprise the esters of ethylenically unsaturated monocarboxylic acids and polyhydric alcohols, such as, for example, ethylene glycol diacrylate, ethylene glycol dimethacrylate, butylene glycol dicrotonate, hexylene glycol diacrylate, ethylene glycol acrylate, methacrylate and cyclohexenediol diacrylate. Another preferred group comprise the esters of saturated aliphatic or cycloaliphatic monohydric alcohols and unsaturated polycarboxylic acids, such as, for example, diethyl maleate, dibutyl fumarate, dibutyl 3-butenedioate acid and the like. Also useful, but less preferred are the esters of ethylenically unsaturated alcohols and monocarboxylic acids, such as allyl acetate, allyl butyrate, allyl propionate, allyl cyclohexane-carboxylate and the like.

Especially preferred are the esters of the ethylenically unsaturated aliphatic and cycloaliphatic monocarboxylic acids containing from 3 to 10 carbon atoms and the saturated aliphatic and cycloaliphatic monohydric alcohols containing from 1 to 10 carbon atoms, and the esters of the aforedescribed monocarboxylic acids and saturated aliphatic and cycloaliphatic di- and trihydric alcohols containing from 2 to 10 carbon atoms. Particularly superior results are obtained when the unsaturated ester contains from 8 to 12 carbon atoms. Ethyl acrylate is especially preferred.

The ratio in which the alkenyl-substituted aromatic compounds and the unsaturated ester are used in preparing the graft copolymer may vary within certain limits. The alkenyl-substituted aromatic compound and the unsaturated ester may be employed in ratios varying from 2.5:1 to 4:1. The best properties in the graft polymer are obtained when the ratio of the alkenyl-substituted aromatic compounds to the ester is about 3:1.

The total amount of the grafting monomers to be used in preparing the new graft copolymers will vary from about 40 to 70 parts of such monomers to 60 to 30 parts of the above-described backbone polymer. In a preferred embodiment of the invention, the grafting monomers constitute about 60 parts by weight and the backbone copolymer comprises about 40 parts by weight.

In such a preferred embodiment, the polyolefin is present in only relatively small proportions, e.g. not more than about 1 part by weight. However, the presence of a relatively small amount of the diene in the backbone of the copolymer and consequently present in the final graft copolymer yields unexpectedly superior impart strength.

The graft copolymer of the invention are prepared by adding the above-described grafting monomers to the polymerization medium containing the preformed polymer and then continuing the polymerization. In the preferred procedure, the desired monomers are added all at once or in small increments to the medium containing the above-described preformed polymer and the mixture then heated in an inert atmosphere.

In some cases, it may be desirable to add additional free radical yielding catalysts, such as those described above to speed the formation of the graft. Such catalysts are generally added in amounts varying from about 0.1% to 4% by weight.

Additional emulsifying agent may also be added. Particularly preferred agents include tetrasodium-N-(1,2-dicarboxyethyl) - N - octadecylsulfosuccinamate, sodium dodecyl benzene sulfonate, and decylbenzene sodium sulfonate. Especially preferred is the above-described Aerosol 22. Such agents are preferably employed in amounts varying from about .5% to 5% by weight of the monomer and polymer being polymerized. The monomers may be added all at one time or one or more of the monomers may be added in small increments or continuously throughout the reaction.

Temperatures employed in the formation of the graft will vary depending upon the rate desired, catalyst selected and the like. Preferred temperatures range from about 40° C. to about 150° C. The rate of grafting generally goes up as the temperature is increased. Particularly preferred temperatures to be used with the conventional free radical yielding catalysts range from about 40° C. to about 80° C. Superatmospheric, atmospheric or subatmospheric pressures may be used as desired.

The grafting process is accomplished in the absence of molecular oxygen. This is preferably accomplished by conducting the reaction in the presence of an inert gas, such as nitrogen, methane and the like.

At the conclusion of the reaction, i.e. when substantially all of the monomer has been consumed, the graft copolymer can be recovered from the reaction mixture by any suitable method such as freezing, precipitation, extraction, filtration and the like. In the case of aqueous emulsions systems, the copolymer is preferably removed by freezing and thawing or by coagulation with alcohols and the like.

The graft copolymers prepared by the above process are soft to hard solids having molecular weights ranging from about 5,000 to about 150,000 as determined by the light scattering technique as described in Chem. Rev., vol. 40, page 319 (1940). The copolymers may be molded in conventional injection and compression molding techniques to form valuable molded articles. The copolymers are particularly suited for use in preparing articles, such as drinking tumblers, dishes, and food covers and the like. They should also prove useful in lens systems where the optical requirements are not stringent, for example, in tail light covers on automobiles. Other uses will be obvious to those skilled in the art.

The following examples more specifically describe a preferred manner in which the invention may be practiced and illustrated certain of its advantages and the benefits to be obtained therefrom. In the examples all parts are by weight, and impact strengths are in foot-pounds, per inch, notch, determined in accordance with ASTM D256–54T, ⅛-inch bar.

Example I

A heavy-walled glass container was used as the reaction vessel for the polymerization. A water solution of tetrasodium - N - (1,2 - dicarboxyethyl) - N - octadecylsulfosuccinamate, was prepared, containing 1.5 parts of the emulsifier and 180 parts of water. The pH of this solution was adjusted to 10 by the addition of 10 percent sodium hydroxide solution. The following mixture was then placed in the glass container:

| Ingredients: | Parts by weight |
|---|---|
| Water | 180 |
| Tetrasodium-N-(1,2-dicarboxyethyl)-N-octadecylsulfosuccinamate | 1.5 |
| Ammonium persulfate | 1 |
| Tertiary-dodecyl mercaptan | 0.1 |
| Styrene | 39.5 |
| Isoprene | 0.5 |

Air was removed from the container by purging with nitrogen. The container was closed with a self-sealing cap, and the container was then placed in a rack and rotated end-over-end in a thermostatically controlled water bath set at 50° C. The reaction was run to completion in about three hours. The copolymer so formed serves as the base polymer, or backbone, for formation of the graft polymer.

For the grafting portion of the polymerization, 45 parts by weight of styrene and 15 parts by weight of ethyl acrylate were added to the reaction chamber containing the backbone copolymer. The reaction vessel was then replaced in the water bath and polymerization allowed to continue at 50° C. The polymer was coagulated by freezing and thawing and filtering.

The graft polymer formed was a clear solid exhibiting an impact strength of 0.72.

Example II

Following the procedure of Example I, 45 parts of styrene and 15 parts of ethylacrylate were grafted upon a copolymer backbone consisting essentially of 39.88 parts of styrene and 0.20 part of isoprene. The polymerization temperature was 55° C. The graft polymer thus prepared was clear and exhibited an impact strength of 0.57.

Example III

Following the procedure of Example I, 45 parts of styrene and 15 parts of ethyl acrylate were grafted upon a copolymer backbone consisting essentially of 39.96 parts of styrene and 0.04 part of isoprene. The polymerization temperature was 55° C. This polymer exhibited a somewhat lower impact strength and was less clear.

Example IV

A copolymer backbone, containing 57.6 parts of styrene and 2.4 parts of butadiene, was polymerized at 65° C.; 1.5 parts of tetrasodium-N-(1,2-dicarboxyethyl) - N-octadecylsulfosuccinamate were used as the emulsifier. Next, 30 parts of styrene and 10 parts of ethyl acrylate were grafted upon the copolymer backbone. A graft polymer was thus prepared, which exhibited an impact strength of 0.43.

Example V

A copolymer backbone, consisting essentially of 54 parts of styrene, 5.9 parts of ethyl acrylate, and 0.1 part of isoprene was polymerized at 50° C. A graft of 30 parts of styrene and 10 parts of ethyl acrylate was then polymerized with the backbone, forming a clear graft polymer. The impact strength of this polymer was 0.61.

Example VI

Using emulsion-polymerization techniques, a backbone terpolymer of 53 parts of styrene, 6 parts of ethyl acrylate, and 6 parts of isoprene was polymerized at 50° C. A mixture of 25 parts of styrene and 10 parts of ethyl acrylate was then grafted upon the copolymer backbone. The clear graft polymer thus prepared had an impact strength of 0.61.

Example VII

If methyl styrene, ethyl styrene, dimethyl styrene, or mixtures thereof are used in place of all, or part, of this styrene in the preceding examples, there will be obtained graft polymers having impact strengths equal, or superior, to conventional polystyrenes.

Example VIII

If methyl acrylate, ethyl methacrylate, methyl methacrylate, or mixtures thereof, are used in place of all, or part of the ethyl acrylate in the grafting portion of the polymers of the preceding examples, there will be obtained graft polymers having impact strengths equal, or superior, to conventional polystyrenes.

Example IX

Using the emulsion-polymerization technique, 38 parts of styrene and 1.9 parts of isoprene were polymerized. A mixture of 45 parts of styrene and 15 parts of ethyl acrylate were then grafted upon the copolymer previously formed. The clear graft polymer produced exhibited an impact strength of 1.10.

Example X

Using emulsion-polymerization techniques, a copolymer consisting essentially of 54 parts of styrene and 6 parts of ethyl acrylate was prepared. A mixture of 28 parts of styrene and 12 parts of ethyl acrylate were grafted upon this copolymer. A graft polymer resulted, which exhibited an impact strength of 0.35.

It is to be noted that Example X is not intended to be illustrative of polymers prepared by this invention. Rather, it is intended to illustrate the novel and important effect of the addition of a conjugated diene, such as isoprene, to the graft polymer. It can readily be seen that the absence of the conjugated diene results in a reduced impact strength in the resulting polymer.

It is obvious from the above description and examples that many modifications can be made without departing from the spirit and scope of the invention. It is intended that all such modifications should be included hereunder.

We claim as our invention:

1. A graft copolymer composition comprising the product of polymerization of a mixture of (1) 40 to 70 parts by weight of a mixture of monomers comprising styrene and an alkyl ester of an ethylenically unsaturated monocarboxylic acid containing up to 12 carbon atoms, and (2) 60 to 30 parts by weight of a copolymer of styrene and a conjugated diene containing 4 to 8 carbon atoms, which copolymer contains no more than 10 parts per 100 parts of copolymer of polymerized conjugated diene.

2. The graft copolymer composition of claim 1 where the alkyl ester of an ethylenically unsaturated monocarboxylic acid is ethyl acrylate.

3. The graft copolymer composition of claim 1 wherein the conjugated diene used in making the copolymer is isoprene.

4. A graft copolymer composition comprising the product of polymerization of a mixture of (1) 40 to 70 parts by weight of a mixture of monomers comprising styrene and an unsaturated monocarboxylic acid ester containing up to 12 carbon atoms wherein the styrene and unsaturated ester are employed in a weight ratio of 2.5:1 to 4:1, and (2) 60 to 30 parts by weight of a preformed copolymer of styrene and a conjugated diene containing 4 to 8 carbon atoms, the said preformed copolymer containing not more than 10 parts per 100 parts of copolymer of polymerized conjugated diene.

5. The graft copolymer composition of claim 4 where the unsaturated ester is ethylene glycol diacrylate.

6. The graft copolymer composition of claim 4 where the unsaturated ester is methyl methacrylate.

7. A graft copolymer composition comprising the product of polymerization of a mixture of (1) 60 parts of a mixture of styrene and ethyl acrylate and (2) 40 parts of a preformed copolymer of styrene and a conjugated diene containing 5 to 7 carbon atoms, said preformed copolymer containing not more than 10 parts per 100 parts of copolymer of polymerized conjugated diene.

8. The graft copolymer composition of claim 7 where the polymerized conjugated diene comprises about 0.1 to 2.0 parts by weight of the preformed copolymer.

9. The graft copolymer composition of claim 7 where the polymerized conjugated diene comprises about 0.5 part by weight of the preformed copolymer.

10. A graft copolymer composition comprising the product of polymerization of a mixture of (1) about 45 parts by weight of styrene, (2) about 15 parts by weight of ethyl acrylate, and (3) 40 parts of a copolymer backbone of about 39.5 parts by weight of styrene and about 0.5 part by weight of isoprene.

11. A graft copolymer composition comprising the product of polymerization of a mixture of (1) about 54 parts by weight of styrene, (2) 5.9 parts by weight of ethyl acrylate, and 0.1 part by weight of ethylene diacrylate, and (3) 40 parts of a copolymer of about 39.5 parts by weight of styrene and about 0.5 part by weight of isoprene.

12. A graft copolymer composition comprising the product of polymerization of a mixture of (1) 40 to 70 parts by weight of a mixture of an alkenyl-substituted aromatic compound selected from the group consisting of styrene, alpha-alkylstyrenes and the mono- and dichloro- and mono- and polyalkyl-substituted styrenes wherein the substituents are attached to ring carbon atoms, said substituted styrenes containing up to 12 carbon atoms, and an ethylenically unsaturated monocarboxylic acid ester containing up to 12 carbon atoms, and (2) 60 to 30 parts by weight of a preformed copolymer of 99.5 to 90 parts by weight of an alkenyl-substituted aromatic compound hereinbefore described and 0.5 to 10 parts by weight of a conjugated diene containing from 4 to 8 carbon atoms.

13. A graft copolymer as in claim 12 wherein the alkenyl-substituted aromatic compound in the mixture of monomers and in the preformed copolymer is styrene.

14. A graft copolymer composition as in claim 12 wherein the conjugated diene is isoprene.

15. A graft copolymer composition as in claim 12 wherein the ester is ethyl acrylate.

References Cited in the file of this patent

UNITED STATES PATENTS

| | | |
|---|---|---|
| 2,512,697 | Te Grotenhuis | June 27, 1950 |
| 2,609,353 | Rubens et al. | Sept. 2, 1952 |
| 2,646,418 | Lang | July 21, 1953 |
| 2,802,808 | Hayes | Aug. 13, 1957 |
| 2,843,561 | Ingley et al. | July 15, 1958 |
| 2,857,360 | Feuer | Oct. 21, 1958 |